(12) United States Patent
Wu

(10) Patent No.: US 12,170,923 B2
(45) Date of Patent: Dec. 17, 2024

(54) UPLINK TRANSMISSION DROP METHOD, UPLINK TRANSMISSION DROP CONFIGURATION METHOD, AND RELATED DEVICE

(71) Applicant: VIVO MOBILE COMMUNICATION CO., LTD., Guangdong (CN)

(72) Inventor: Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 358 days.

(21) Appl. No.: 17/565,225

(22) Filed: Dec. 29, 2021

(65) Prior Publication Data

US 2022/0124556 A1 Apr. 21, 2022

Related U.S. Application Data

(63) Continuation of application No. PCT/CN2020/097993, filed on Jun. 24, 2020.

(30) Foreign Application Priority Data

Jul. 4, 2019 (CN) .......................... 201910600646.6

(51) Int. Cl.
H04W 28/06 (2009.01)
H04W 72/1268 (2023.01)

(52) U.S. Cl.
CPC ....... *H04W 28/06* (2013.01); *H04W 72/1268* (2013.01)

(58) Field of Classification Search
None
See application file for complete search history.

(56) References Cited

U.S. PATENT DOCUMENTS

| 2009/0116426 A1 | 5/2009 | Ho |
| 2011/0194512 A1 | 8/2011 | Park et al. |
| 2014/0247732 A1 | 9/2014 | Yang et al. |
| 2016/0057743 A1* | 2/2016 | Aiba ................ H04W 72/04 370/329 |
| 2016/0262068 A1 | 9/2016 | Won et al. |

(Continued)

FOREIGN PATENT DOCUMENTS

| CN | 101849392 A | 9/2010 |
| CN | 102469645 A | 5/2012 |

(Continued)

OTHER PUBLICATIONS

CN Office Action in Application No. 201910600646.6 Dated Jul. 20, 2021.

(Continued)

*Primary Examiner* — Anh Vu H Ly
(74) *Attorney, Agent, or Firm* — BROOKS KUSHMAN P.C.

(57) ABSTRACT

An uplink transmission drop method, an uplink transmission drop configuration method, and a related device are provided. The method includes receiving configuration information transmitted by a network device, where the configuration information is used for configuring target service information for uplink transmissions and uplink transmission drop parameters corresponding to the target service information; and dropping uplink transmissions based on the uplink transmission drop parameters.

14 Claims, 4 Drawing Sheets

Receive configuration information transmitted by a network device, where the configuration information is used for configuring target service information for uplink transmissions and uplink transmission drop parameters corresponding to the target service information — 201

Drop uplink transmissions based on the uplink transmission drop parameters — 202

(56) References Cited

U.S. PATENT DOCUMENTS

| | | | |
|---|---|---|---|
| 2018/0131425 A1* | 5/2018 | Li | H04B 7/0626 |
| 2018/0176937 A1 | 6/2018 | Chen et al. | |
| 2019/0166621 A1* | 5/2019 | Yerramalli | H04L 5/0082 |
| 2019/0223117 A1 | 7/2019 | Chai et al. | |
| 2019/0342944 A1* | 11/2019 | Chatterjee | H04W 80/08 |
| 2019/0380125 A1* | 12/2019 | Yamamoto | H04L 5/0057 |
| 2020/0107374 A1 | 4/2020 | Tang | |
| 2020/0120660 A1 | 4/2020 | Wang et al. | |
| 2020/0221469 A1* | 7/2020 | Lee | H04W 76/36 |
| 2021/0022134 A1* | 1/2021 | Chen | H04L 5/0078 |
| 2021/0376985 A1* | 12/2021 | Zhou | H04L 5/0053 |
| 2022/0159683 A1* | 5/2022 | Islam | H04W 72/1268 |

FOREIGN PATENT DOCUMENTS

| | | |
|---|---|---|
| CN | 106685604 A | 5/2017 |
| CN | 109089268 A | 12/2018 |
| CN | 109152025 A | 1/2019 |
| CN | 109587708 A | 4/2019 |
| WO | 2018059489 A1 | 4/2018 |
| WO | 2018227510 A1 | 12/2018 |

OTHER PUBLICATIONS

"Considerations on Starvation Avoidance solutions" 3GPP TSG RAN WG2 #56bis, LG Electronics Inc., R2-070298, Jan. 15, 2007.
Written Opinion and International Search Report in Application No. PCT/CN2020/097993 Dated Jan. 13, 2022.
JP Office Action in Application No. 2022-500130 Dated Dec. 13, 2022.
European Search Report in Application No. 20834704.7 Dated Jun. 28, 2022.
"Multiplexing of UL transmissions with different data durations and latency requirements" 3GPP TSG RAN WG1 Meeting#90, Intel Corporation, R1-1712601, Aug. 21, 2017.
"Multiplexing data with different transmission durations" 3GPP TSG RAN WG1 Meeting 90bis, vivo, R1-1717502, Oct. 9, 2017.
"On resources conflict involving multiple CGs PUSCH" 3GPP TSG RAN WG1 #97, vivo, R1-1906153, May 13, 2019.

* cited by examiner

UPLINK TRANSMISSION DROP METHOD, UPLINK TRANSMISSION DROP CONFIGURATION METHOD, AND RELATED DEVICE

CROSS-REFERENCE TO RELATED APPLICATIONS

This application claims is a continuation application of International Application No. PCT/CN2020/097993 filed on Jun. 24, 2020, which priority to Chinese Patent Application No. 201910600646.6, filed in China on Jul. 4, 2019, which is incorporated herein by reference in its entirety.

TECHNICAL FIELD

This disclosure relates to the field of communications technologies, and in particular, to an uplink transmission drop method, an uplink transmission drop configuration method, and a related device.

BACKGROUND

With development of communications technologies, one terminal may be equipped with various transceivers that support different radio access network technologies (RAT), for example, a long term evolution (LTE) transceiver, a 5th generation communications network (5G) transceiver, a wireless network Wi-Fi transceiver, a Bluetooth transceiver, and a global navigation satellite system (GNSS) transceiver.

In conventional technology, a receiver of the terminal receives interference from transmitters of the UE at adjacent or harmonic frequencies. For example, in a case that an LTE transmission frequency of the terminal interferes with frequencies of other wireless technologies (for example, Wi-Fi), the network device may configure an uplink transmission drop rate for the terminal, so that the terminal can drop uplink transmissions based on that drop rate. However, dropping uplink transmissions by the terminal only based on the drop rate is less targeted. For example, in a case that the terminal has a plurality of different uplink transmissions corresponding to different service types, different uplink transmissions have different priorities. If uplink transmission dropping is directly based on a configured rate, the terminal may drop uplink transmissions of some low-latency and high-reliability services, so that delay and reliability performance of uplink transmissions of low-latency and high-reliability services cannot be guaranteed. Therefore, in conventional technology, there is a problem that uplink transmission dropping is less targeted in uplink transmission drop procedures.

SUMMARY

Embodiments of this disclosure provide an uplink transmission drop method, an uplink transmission drop configuration method, and a related device.

According to a first aspect, an embodiment of this disclosure provides an uplink transmission drop method, applied to a terminal and including:

receiving configuration information transmitted by a network device, where the configuration information is used for configuring target service information for uplink transmissions and uplink transmission drop parameters corresponding to the target service information; and dropping uplink transmissions based on the uplink transmission drop parameters.

According to a second aspect, an embodiment of this disclosure provides an uplink transmission drop configuration method, applied to a network device and including:

transmitting configuration information, where the configuration information is used for configuring target service information for uplink transmissions and uplink transmission drop parameters corresponding to the target service information.

According to a third aspect, an embodiment of this disclosure further provides a terminal, including:

a receiving module, configured to receive configuration information transmitted by a network device, where the configuration information is used for configuring target service information for uplink transmissions and uplink transmission drop parameters corresponding to the target service information; and a first transmitting module, configured to drop uplink transmissions based on the uplink transmission drop parameters.

According to a fourth aspect, an embodiment of this disclosure provides a network device, including:

a second transmitting module, configured to transmit configuration information, where the configuration information is used for configuring target service information for uplink transmissions and uplink transmission drop parameters corresponding to the target service information.

According to a fifth aspect, an embodiment of this disclosure further provides a terminal, including a memory, a processor, and a program stored in the memory and capable of running on the processor, where when the program is executed by the processor, the steps of the uplink transmission drop method are implemented.

According to a sixth aspect, an embodiment of this disclosure further provides a network device, including a memory, a processor, and a program stored in the memory and capable of running on the processor, where when the program is executed by the processor, the steps of the uplink transmission drop configuration method are implemented.

According to a seventh aspect, an embodiment of this disclosure further provides a computer-readable storage medium, where a computer program is stored in the computer-readable storage medium. When the computer program is executed by a processor, the steps of the uplink transmission drop method described above are implemented, or when the computer program is executed by the processor, the steps of the uplink transmission drop configuration method described above are implemented.

DESCRIPTION OF EMBODIMENTS

The following clearly and completely describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

In the specification and claims of this application, the terms "including", and any other variants mean to cover a non-exclusive inclusion. For example, a process, method, system, product, or device that includes a list of steps or units is not necessarily limited to those steps or units, but may include other steps or units not expressly listed or inherent to such a process, method, product, or device. In addition, in the specification and claims, the use of "and/or" represents presence of at least one of the connected objects, for example, "A and/or B" indicates that the following three cases: only A, only B, or both A and B.

In the embodiments of this disclosure, terms such as "an example" or "for example" are used to represent giving an example, an instance, or an illustration. Any embodiment or design solution described as "an example" or "for example" in the embodiments of this disclosure shall not be interpreted as being more preferred or advantageous than other embodiments or design solutions. Specifically, the terms such as "an example" or "for example" are used to present related concepts in a specific manner.

The following describes the embodiments of this disclosure with reference to the accompanying drawings. An uplink transmission drop method, an uplink transmission drop configuration method, a terminal, and a network device provided in the embodiments of this disclosure may be applied to a wireless communications system. The wireless communications system may be a 5G system, or an evolved long term evolution (eLTE) system, or a later evolved communications system.

Figure 1:
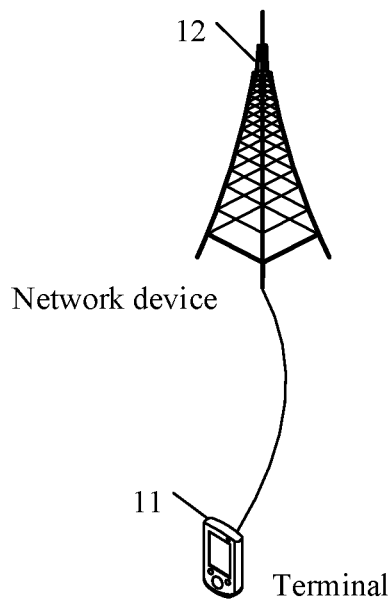
FIG. 1 is a structural diagram of a network system to which an embodiment of this disclosure may be applied.

Referring to FIG. 1, FIG. 1 is a structural diagram of a network system to which an embodiment of this disclosure may be applied. As shown in FIG. 1, the network system includes a terminal 11 and a network device 12. The terminal 11 may be user equipment or other terminal-side devices such as a mobile phone, a tablet personal computer, a laptop computer, a personal digital assistant (PDA), a mobile Internet device (MID), or a wearable device. It should be noted that a specific type of the terminal 11 is not limited in the embodiments of this disclosure. The network device 12 may be a 5G base station, or a base station of a later version, or a base station in other communications systems, or may be referred to as a NodeB, or an evolved NodeB, or a transmission reception point (TRP), or an access point (AP), or other terms in the field. Provided that a same technical effect is achieved, the network device is not limited to any specific technical term. In addition, the network device 12 may be a master node (MN) or a secondary node (SN). It should be noted that, in the embodiments of this disclosure, the 5G base station is used as only an example, and the network device is not limited to any specific type.

Figure 2:
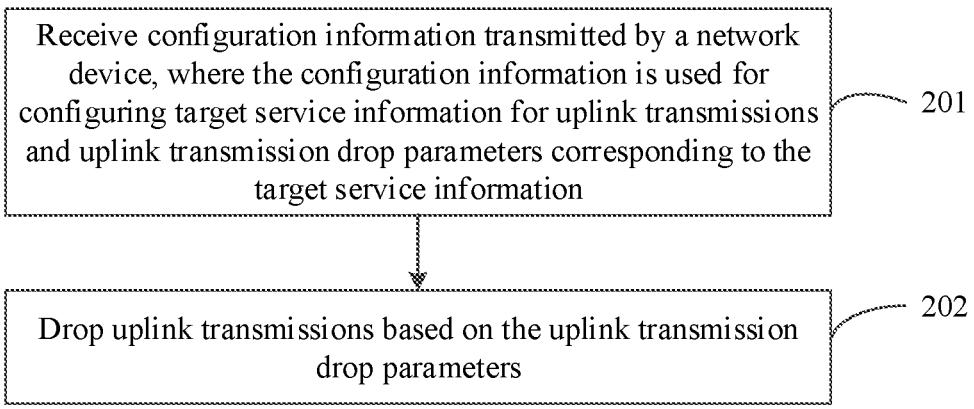
FIG. 2 is a flowchart of an uplink transmission drop method according to an embodiment of this disclosure.

Referring to FIG. 2, FIG. 2 is a flowchart of an uplink transmission drop method according to an embodiment of this disclosure. The method is applied to a terminal. As shown in FIG. 2, the method includes the following steps:

Step 201. Receive configuration information transmitted by a network device, where the configuration information is used for configuring target service information for uplink transmissions and uplink transmission drop parameters corresponding to the target service information; and Step 202. Drop uplink transmissions based on the uplink transmission drop parameters.

In this embodiment of this disclosure, a network device can configure different uplink transmissions corresponding to different uplink transmission drop parameters for the terminal, and different uplink transmissions can be understood as uplink transmissions having different target service information. In other words, in an optional embodiment, the target service information is in one-to-one correspondence to the uplink transmission drop parameters. Certainly, in another embodiment, a plurality of target service information may be set to correspond to one uplink transmission drop parameter.

The uplink transmission drop means dropping part of uplink transmissions, for example, dropping uplink transmissions in 1 slot out of 100 slots for the target service information.

In this embodiment of this disclosure, the target service information for uplink transmissions and the uplink transmission drop parameters corresponding to the target service information are configured, and uplink transmissions are dropped based on the uplink transmission drop parameters. As such, uplink transmissions can be dropped for specified target service information. Therefore, uplink transmission dropping is more targeted in uplink transmission drop procedures. In this way, delay and reliability performance of uplink transmissions for a low-latency and high-reliability service can be guaranteed in uplink transmission drop procedures.

In an optional embodiment, the uplink transmission drop parameter is used to indicate any one of the following:

Indication manner 1: an uplink transmission drop number or an uplink transmission drop rate for first service information in uplink transmissions corresponding to the first service information;

Indication manner 2: an uplink transmission drop number or an uplink transmission drop rate for second service information in uplink transmissions corresponding to N pieces of first service information, where N is an integer greater than 1 and the second service information is one of the N pieces of first service information;

Indication manner 3: a number of uplink transmission drops for the first service information or the second service information within a preset period; and Indication manner 4: an uplink transmission drop rate for the first service information or the second service information within a preset period; where the first service information is service information contained in the target service information.

In this embodiment of this disclosure, one or more pieces of service information may be contained in the target service information, and the first service information may be one piece of service information in the target service information.

It should be noted that if the corresponding uplink transmission drop parameter is not configured for one given piece of service information in the target service information, its uplink transmissions can be dropped based on a default allowed drop number or allowed drop rate, or based on an allowed drop number or allowed drop rate that is uniformly configured by the network device.

In the foregoing indication manner 1, an uplink transmission drop number or an uplink transmission drop rate may be specifically indicated for each piece of service information in the target service information.

In the foregoing indication manner 2, the N pieces of first service information may be a group of service information in the target service information. Specifically, the target service information may include one or more groups of service information (each group of service information may include an identical or different number of pieces of service information), and one piece of first service information in the N pieces of first service information may be set to be dropped. In this embodiment of this disclosure, service information under one service type is classified into one group.

In the foregoing indication manner 3 and indication manner 4, a time length of the preset period may be set based on actual needs, for example, set to 100 ms.

It should be noted that the uplink transmission drop parameter may vary with the content indicated by the transmission drop parameter. For example, in an optional embodiment, in a case that the uplink transmission drop parameter is used to indicate uplink drop data, the foregoing indication manner 1 to indication manner 3 are described in detail.

In a first embodiment, in a case that the uplink transmission drop parameter is used to indicate an uplink transmission drop number for first service information in uplink transmissions corresponding to the first service information, the uplink transmission drop parameter includes a number of first uplink transmissions corresponding to the first service information and an allowed number of drops in the number of first uplink transmissions.

In this embodiment, for example, the high-reliability physical uplink shared channel (PUSCH) has uplink transmissions in 100 slots, and uplink transmissions of the high-reliability PUSCH in 1 slot are allowed to be dropped.

In a second embodiment, in a case that the uplink transmission drop parameter is used to indicate an uplink transmission drop number for second service information in uplink transmissions corresponding to N pieces of first service information, the uplink transmission drop parameter includes a number of second uplink transmissions and an allowed number of drops for the second service information in the number of second uplink transmissions, where the number of second uplink transmissions is a sum of numbers of uplink transmissions corresponding to the N pieces of first service information.

In this embodiment, for example, high-reliability and common-reliability PUSCHs have uplink transmissions in 100 slots, and uplink transmissions of the high-reliability PUSCH in 1 slot are allowed to be dropped.

In a third embodiment, in a case that the uplink transmission drop parameter is used to indicate an uplink transmission drop number for the first service information or the second service information within a preset period, the uplink transmission drop parameter includes duration of the preset period and an allowed number of dropped third uplink transmissions for the first service information or the second service information within the preset period.

In this embodiment, for example, the preset period is 100 ms, or 100 consecutive uplink slots, or 100 slots (including uplink slots and downlink slots), and uplink transmissions of the high-reliability PUSCH in 1 slot are allowed to be dropped within the preset period.

It should be noted that in a case that the uplink transmission drop parameter is used to indicate an uplink transmission drop rate, the uplink transmission drop parameter may include a drop rate (for example, a drop rate for the high-reliability PUSCH is two percent, which means that uplink transmissions of the high-reliability PUSCH in 2 slots are allowed to be dropped out of uplink transmissions of the high-reliability PUSCH in 100 slots), or a drop rate can be indicated in the same way as the uplink transmission drop number is indicated.

Optionally, the target service information includes service information corresponding to at least one of the following service types:
  channel type;
  uplink transmission priority;
  logical channel index;
  logical channel priority;
  reliability grade; and
  latency grade.

The channel type may include one of PUSCH, physical uplink control channel (PUCCH), physical random access channel (PRACH), and sounding reference signal (SRS).

Further, in a case that there are at least two pieces of third service information under one service type of one target uplink transmission, fourth service information of the target uplink transmission is determined according to a configuration by a network device or a protocol specification, where the fourth service information is one of the at least two pieces of third service information.

In an optional embodiment, in a case that the service type corresponding to the third service information is uplink transmission priority or logical channel priority, the fourth service information is first priority information, where a priority corresponding to the first priority information is higher or lower than a priority corresponding to the second priority information, the first priority information is one of the at least two third service information, and the second priority information is priority information corresponding to service information other than the fourth service information in the at least two pieces of third service information.

In this embodiment, for example, in a case that the service type is uplink transmission priority and PUSCH includes data of priority 1 and priority 2, the at least two pieces of third service information include the uplink transmission priority 1 and uplink transmission priority 2. As such, in a case that the first priority information is the uplink transmission priority 1, the second priority information is the uplink transmission priority 2; in a case that the first priority information is the uplink transmission priority 2, the second priority information is the uplink transmission priority 1.

For example, in a case that the service type is logical channel priority and PUSCH includes data of logical channel priority 1 and logical channel priority 2, the at least two pieces of third service information include the logical channel priority 1 and logical channel priority 2. As such, in a case that the first priority information is the logical channel priority 1, the second priority information is the priority 2 of logical channel; in a case that the first priority information is the priority 2 of logical channel, the second priority information is the logical channel priority 1.

In another optional embodiment, in a case that the service type corresponding to the third service information is logical channel index, the fourth service information is first logical channel index information, where a logical channel index corresponding to the first logical channel index information is greater or less than a logical channel index corresponding to second logical channel index information, the first logical channel index information is one of the at least two pieces of third service information, and the second logical channel index information is logical channel index information corresponding to service information other than the fourth service information in the at least third service information.

In this embodiment, for example, in a case that the service type is logical channel index and PUSCH includes data of logical channel index 1 and logical channel index 2, the at least two pieces of third service information include the logical channel index 1 and logical channel index 2. As such, in a case that the first priority information is the logical channel index 1, the second priority information is the logical channel index 2; in a case that the first priority information is the logical channel index 2, the second priority information is the logical channel index 1.

In another optional embodiment, in a case that the service type corresponding to the third service information is reliability grade or latency grade, the fourth service information is first grade information, where a grade corresponding to the first grade information is higher or lower than a grade corresponding to the second grade information, the first grade information is one of the at least two pieces of third service information, and the second grade information is grade information corresponding to service information other than the fourth service information in the at least third service information.

In this embodiment, for example, in a case that the service type is reliability grade and PUSCH includes data of reliability grade 1 and reliability grade 2, the at least two pieces of third service information include the reliability grade 1 and reliability grade 2. As such, in a case that the first priority information is the reliability grade 1, the second priority information is the reliability grade 2; in a case that the first priority information is the reliability grade 2, the second priority information is the reliability grade 1.

For example, in a case that the service type is latency grade and PUSCH includes data of latency grade 1 and latency grade 2, the at least two pieces of third service information include the latency grade 1 and latency grade 2. As such, in a case that the first priority information is the latency grade 1, the second priority information is the latency grade 2; in a case that the first priority information is the latency grade 2, the second priority information is the latency grade 1.

For better understanding of this disclosure, the following describes the embodiments of this disclosure in detail.

In an embodiment of this disclosure, uplink transmission dropping specifically includes the following step 1 and step 2:

Step 1: A network device configures uplink transmission drop parameters corresponding to different uplink transmissions for a terminal.

The "uplink transmission drop parameters corresponding to different uplink transmissions" include target service information for uplink transmissions and uplink transmission drop parameters corresponding to the target service information.

The target service information includes service information corresponding to at least one of the following service types:
- channel type (for example, PUSCH, or PUCCH, or SR, or PRACH, or SRS);
- uplink transmission priority (for example, priority 1);
- logical channel index corresponding to uplink transmission (for example, data transmission corresponding to logical channel 1);
- logical channel priority corresponding to uplink transmission (for example, data transmission corresponding to logical channel priority 1);
- reliability grade corresponding to uplink transmission (for example, high-reliability (or reliability grade 1) PUSCH transmission); and
- latency grade corresponding to uplink transmission (for example, low-latency (or latency grade 1) PUSCH transmission).

The uplink transmission drop parameters corresponding to the target service information are used for conducting any one of the following:

Method 1: configuring for the terminal an uplink transmission drop number for one first specific service in uplink transmissions corresponding to the first specific service.

Method 2: configuring for the UE an uplink transmission drop number for one second specific service in uplink transmissions corresponding to a plurality of first specific services.

Method 3: configuring an allowed number of dropped uplink transmissions of the first specific service within one period of time.

For the foregoing method 1, configuration information corresponding to the uplink transmission drop parameter may include:
a number of uplink transmissions corresponding to the first specific service information, for example, the high-reliability PUSCH having uplink transmissions in 100 slots;
and an allowed number of dropped uplink transmissions for the first specific service in "the number of uplink transmissions corresponding to the first specific service information", for example, in a case of "the high-reliability PUSCH having uplink transmissions in 100 slots", uplink transmissions of the high-reliability PUSCH in 1 slot are allowed to be dropped.

For the foregoing method 2, the configuration information corresponding to the uplink transmission drop parameter may include:
a number of uplink transmissions corresponding to a plurality of first specific service information (for example, high-reliability and common-reliability PUSCHs having uplink transmissions in 100 slots); and
an allowed number of dropped uplink transmissions for one second specific service information in the "number of uplink transmissions corresponding to the plurality of first specific service information". For example, in a case of "high-reliability and common-reliability PUSCHs having uplink transmissions in 100 slots", uplink transmissions of the high-reliability PUSCH in 1 slot are allowed to be dropped.

For the foregoing method 3, the configuration information corresponding to the uplink transmission drop parameter may include:
duration, for example, 100 ms, 100 consecutive uplink slots, or 100 slots (including uplink and downlink slots); and
an allowed number of dropped uplink transmissions for the first specific service within the duration, for example, uplink transmissions of the high-reliability PUSCH in 1 slot are allowed to be dropped out of 100 consecutive uplink slots.

Step 2: The terminal may drop uplink transmissions for the first specific service within a configured allowed range according to the configuration of step 1. For example, in a case that a network device configures that uplink transmissions of the high-reliability PUSCH in 2 slots are allowed to be dropped out of "uplink transmissions of the high-reliability PUSCH in 100 slots", then, the terminal may select to drop uplink transmissions of the high-reliability PUSCH in 2 or fewer slots.

Further, the network device may configure or the protocol may specify a rule such that, when one service type in one uplink transmission includes a plurality of pieces of service information, service information under the service type of the uplink transmission may be determined according to the following rules:

in a case that "uplink transmission priority" of the uplink transmission includes "priority" information of a plurality of services, using low "priority" information or high "priority" information as the service information of the uplink transmission, for example, using priority 2 (low "priority" information) or priority 1 (high "priority" information) if PUSCH includes data of the priority 1 and priority 2;

in a case that "logical channel index" of the uplink transmission includes "logical channel index" information of a plurality of services, using low "logical channel index" information or high "logical channel index" information as the service information of the uplink transmission, for example, using logical channel index 1 or logical channel index 2 if PUSCH includes data of logical channel index 1 and logical channel index 2;

in a case that "logical channel priority" of the uplink transmission includes "logical channel priority" information of a plurality of services, using low "logical channel priority" information or high "logical channel priority" information as the service information of the uplink transmission, for example, using logical channel priority 2 (low "logical channel priority" information) or logical channel priority 1 (high "logical channel priority" information) if PUSCH includes data of logical channel priority 1 and logical channel priority 2;

in a case that "reliability grade" of the uplink transmission includes "reliability grade" information of a plurality of services, using low "reliability grade" information or high "reliability grade" information as the service information of the uplink transmission, for example, using reliability grade 2 (low "reliability grade" information) or reliability grade 1 (high "reliability grade" information) if PUSCH includes data of reliability grade 1 and reliability grade 2; and in a case that "latency grade" of the uplink transmission includes "latency grade" information of a plurality of services, using low "latency grade" information or high "latency grade" information as the service information of the uplink transmission, for example, using latency grade 2 (low "latency grade" information) or latency grade 1 (high "latency grade" information) if PUSCH includes data of latency grade 1 and latency grade 2.

Figure 3:
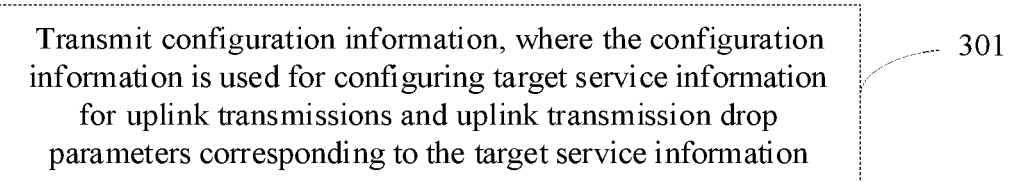
FIG. 3 is a flowchart of an uplink transmission drop configuration method according to an embodiment of this disclosure.

Referring to FIG. 3, FIG. 3 is a flowchart of an uplink transmission drop configuration method according to an embodiment of this disclosure. The method is applied to a network device. As shown in FIG. 3, the method includes the following steps:

Step 301. Transmit configuration information, where the configuration information is used for configuring target service information for uplink transmissions and uplink transmission drop parameters corresponding to the target service information.

Optionally, the target service information is in one-to-one correspondence to the uplink transmission drop parameters.

Optionally, the uplink transmission drop parameter is used to indicate any one of the following:

an uplink transmission drop number or an uplink transmission drop rate for first service information in uplink transmissions corresponding to the first service information;

an uplink transmission drop number or an uplink transmission drop rate for second service information in uplink transmissions corresponding to N pieces of first service information, where N is an integer greater than 1 and the second service information is one of the N pieces of first service information;

an uplink transmission drop number for the first service information or the second service information within a preset period; and an uplink transmission drop rate for the first service information or the second service information within a preset period; where the first service information is service information contained in the target service information.

Optionally, in a case that the uplink transmission drop parameter is used to indicate an uplink transmission drop number for first service information in uplink transmissions corresponding to the first service information, the uplink transmission drop parameter includes a number of first uplink transmissions corresponding to the first service information and an allowed number of drops in the number of first uplink transmissions.

Optionally, in a case that the uplink transmission drop parameter is used to indicate an uplink transmission drop number for second service information in uplink transmissions corresponding to N pieces of first service information, the uplink transmission drop parameter includes a number of second uplink transmissions and an allowed number of drops for the second service information in the number of second uplink transmissions, where the number of second uplink transmissions is a sum of numbers of uplink transmissions corresponding to the N pieces of first service information.

Optionally, in a case that the uplink transmission drop parameter is used to indicate an uplink transmission drop number for the first service information or the second service information within a preset period, the uplink transmission drop parameter includes duration of the preset period and an allowed number of dropped third uplink transmissions for the first service information or the second service information within the preset period.

Optionally, the target service information includes service information corresponding to at least one of the following service types:

channel type;
uplink transmission priority;
logical channel index;
logical channel priority;
reliability grade; and
latency grade.

Optionally, in a case that there are at least two pieces of third service information under one service type of one target uplink transmission, fourth service information of the target uplink transmission is determined according to a configuration by a network device or a protocol specification, where the fourth service information is one of the at least two pieces of third service information.

Optionally, in a case that the service type corresponding to the third service information is uplink transmission priority or logical channel priority, the fourth service information is first priority information, where a priority corresponding to the first priority information is higher or lower than a priority corresponding to the second priority information, the first priority information is one of the at least two third service information, and the second priority information is priority information corresponding to service information other than the fourth service information in the at least two pieces of third service information; and/or in a case that the service type corresponding to the third service information is logical channel index, the fourth service information is first logical channel index information, where a logical channel index corresponding to the first logical channel index information is greater or less than a logical channel index corresponding to second logical channel index information, the first logical channel index information is one of the at least two pieces of third service information, and the second logical channel index information is logical channel index information corresponding to service information other than the fourth service information in the at least third service information; and/or in a case that the service type corresponding to the third service information is reliability grade or latency grade, the fourth service information is first grade information, where a grade corresponding to the first grade information is higher or lower than a grade corresponding to second grade information, the first grade information is one of the at least two pieces of third service information, and the second grade information is grade information corresponding to service information other than the fourth service information in the at least third service information.

It should be noted that this embodiment is an embodiment of a network device corresponding to the embodiment shown in FIG. 2, and for specific implementations of this embodiment, reference may be made to the relevant descriptions about the embodiment shown in FIG. 2, and the same beneficial effect is achieved. To avoid repetition, details are not described herein again.

Figure 4:
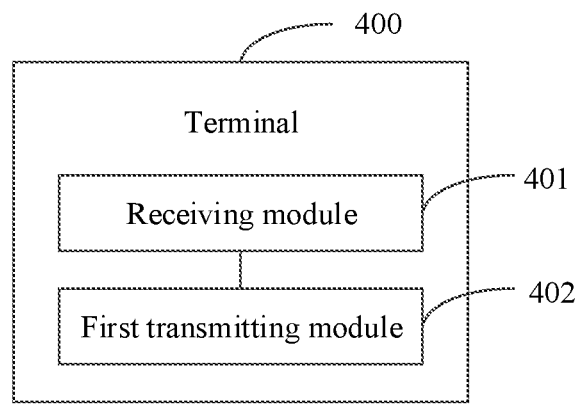
FIG. 4 is a structural diagram of a terminal according to an embodiment of this disclosure.

Referring to FIG. 4, FIG. 4 is a structural diagram of a terminal according to an embodiment of this disclosure. As shown in FIG. 4, the terminal 400 includes:

a receiving module 401, configured to receive configuration information transmitted by a network device, where the configuration information is used for configuring target service information for uplink transmissions and uplink transmission drop parameters corresponding to the target service information; and a first transmitting module 402, configured to drop uplink transmissions based on the uplink transmission drop parameters.

Optionally, the target service information is in one-to-one correspondence to the uplink transmission drop parameters.

Optionally, the uplink transmission drop parameter is used to indicate any one of the following:

an uplink transmission drop number or an uplink transmission drop rate for first service information in uplink transmissions corresponding to the first service information;

an uplink transmission drop number or an uplink transmission drop rate for second service information in uplink transmissions corresponding to N pieces of first service information, where N is an integer greater than 1 and the second service information is one of the N pieces of first service information;

an uplink transmission drop number for the first service information or the second service information within a preset period; and an uplink transmission drop rate for the first service information or the second service information within a preset period; where the first service information is service information contained in the target service information.

Optionally, in a case that the uplink transmission drop parameter is used to indicate an uplink transmission drop number for first service information in uplink transmissions corresponding to the first service information, the uplink transmission drop parameter includes a number of first uplink transmissions corresponding to the first service information and an allowed number of drops in the number of first uplink transmissions.

Optionally, in a case that the uplink transmission drop parameter is used to indicate an uplink transmission drop number for second service information in uplink transmissions corresponding to N pieces of first service information, the uplink transmission drop parameter includes a number of second uplink transmissions and an allowed number of drops for the second service information in the number of second uplink transmissions, where the number of second uplink transmissions is a sum of numbers of uplink transmissions corresponding to the N pieces of first service information.

Optionally, in a case that the uplink transmission drop parameter is used to indicate an uplink transmission drop number for the first service information or the second service information within a preset period, the uplink transmission drop parameter includes duration of the preset period and an allowed number of dropped third uplink transmissions for the first service information or the second service information within the preset period.

Optionally, the target service information includes service information corresponding to at least one of the following service types:

channel type;
uplink transmission priority;
logical channel index;
logical channel priority;
reliability grade; and
latency grade.

Optionally, in a case that there are at least two pieces of third service information under one service type of one target uplink transmission, fourth service information of the target uplink transmission is determined according to a configuration by a network device or a protocol specification, where the fourth service information is one of the at least two pieces of third service information.

Optionally, in a case that the service type corresponding to the third service information is uplink transmission priority or logical channel priority, the fourth service information is first priority information, where a priority corresponding to the first priority information is higher or lower than a priority corresponding to the second priority information, the first priority information is one of the at least two third service information, and the second priority information is priority information corresponding to service information other than the fourth service information in the at least two pieces of third service information; and/or in a case that the service type corresponding to the third service information is logical channel index, the fourth service information is first logical channel index information, where a logical channel index corresponding to the first logical channel index information is greater or less than a logical channel index corresponding to second logical channel index information, the first logical channel index information is one of the at least two pieces of third service information, and the second logical channel index information is logical channel index information corresponding to service information other than the fourth service information in the at least third service information; and/or in a case that the service type corresponding to the third service information is reliability grade or latency grade, the fourth service information is first grade information, where a grade corresponding to the first grade information is higher or lower than a grade corresponding to second grade information, the first grade information is one of the at least two pieces of third service information, and the second grade information is grade information corresponding to service information other than the fourth service information in the at least third service information.

The terminal provided by this embodiment of this disclosure can implement the processes implemented by the terminal in the method embodiment in FIG. 2. To avoid repetition, details are not described herein again.

Figure 5:
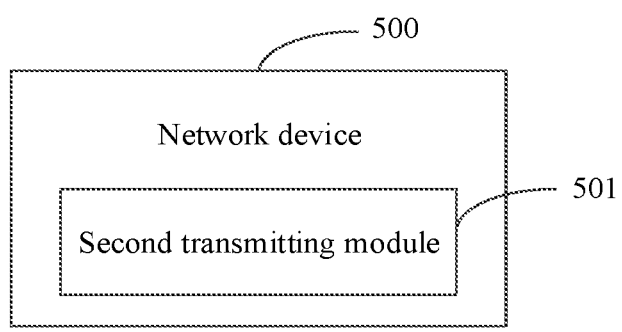
FIG. 5 is a structural diagram of a network device according to an embodiment of this disclosure.

Referring to FIG. 5, FIG. 5 is a structural diagram of a network device according to an embodiment of this disclosure. As shown in FIG. 5, the network device 500 includes:

a second transmitting module 501, configured to transmit configuration information, where the configuration information is used for configuring target service information for uplink transmissions and uplink transmission drop parameters corresponding to the target service information.

Optionally, the target service information is in one-to-one correspondence to the uplink transmission drop parameters.

Optionally, the uplink transmission drop parameter is used to indicate any one of the following:

an uplink transmission drop number or an uplink transmission drop rate for first service information in uplink transmissions corresponding to the first service information;

an uplink transmission drop number or an uplink transmission drop rate for second service information in uplink transmissions corresponding to N pieces of first service information, where N is an integer greater than 1 and the second service information is one of the N pieces of first service information;

an uplink transmission drop number for the first service information or the second service information within a preset period; and an uplink transmission drop rate for the first service information or the second service information within a preset period; where the first service information is service information contained in the target service information.

Optionally, in a case that the uplink transmission drop parameter is used to indicate an uplink transmission drop number for first service information in uplink transmissions corresponding to the first service information, the uplink transmission drop parameter includes a number of first uplink transmissions corresponding to the first service information and an allowed number of drops in the number of first uplink transmissions.

Optionally, in a case that the uplink transmission drop parameter is used to indicate an uplink transmission drop number for second service information in uplink transmissions corresponding to N pieces of first service information, the uplink transmission drop parameter includes a number of second uplink transmissions and an allowed number of drops for the second service information in the number of second uplink transmissions, where the number of second uplink transmissions is a sum of numbers of uplink transmissions corresponding to the N pieces of first service information.

Optionally, in a case that the uplink transmission drop parameter is used to indicate an uplink transmission drop number for the first service information or the second service information within a preset period, the uplink transmission drop parameter includes duration of the preset period and an allowed number of dropped third uplink transmissions for the first service information or the second service information within the preset period.

Optionally, the target service information includes at least one of the following:

channel type;
uplink transmission priority;
logical channel index;
logical channel priority;
reliability grade; and
latency grade.

Optionally, in a case that there are at least two pieces of third service information under one service type of one target uplink transmission, fourth service information of the target uplink transmission is determined according to a configuration by a network device or a protocol specification, where the fourth service information is one of the at least two pieces of third service information.

Optionally, in a case that the service type corresponding to the third service information is uplink transmission priority or logical channel priority, the fourth service information is first priority information, where a priority corresponding to the first priority information is higher or lower than a priority corresponding to the second priority information, the first priority information is one of the at least two third service information, and the second priority information is priority information corresponding to service information other than the fourth service information in the at least two pieces of third service information; and/or in a case that the service type corresponding to the third service information is logical channel index, the fourth service information is first logical channel index information, where a logical channel index corresponding to the first logical channel index information is greater or less than a logical channel index corresponding to second logical channel index information, the first logical channel index information is one of the at least two pieces of third service information, and the second logical channel index information is logical channel index information corresponding to service information other than the fourth service information in the at least third service information; and/or in a case that the service type corresponding to the third service information is reliability grade or latency grade, the fourth service information is first grade information, where a grade corresponding to the first grade information is higher or lower than a grade corresponding to second grade information, the first grade information is one of the at least two pieces of third service information, and the second grade information is grade information corresponding to service information other than the fourth service information in the at least third service information.

The network device provided in this embodiment of this disclosure can implement the processes implemented by the network device in the method embodiment in FIG. 3, reducing the resource overheads for the configuration. To avoid repetition, details are not described herein again.

Figure 6:
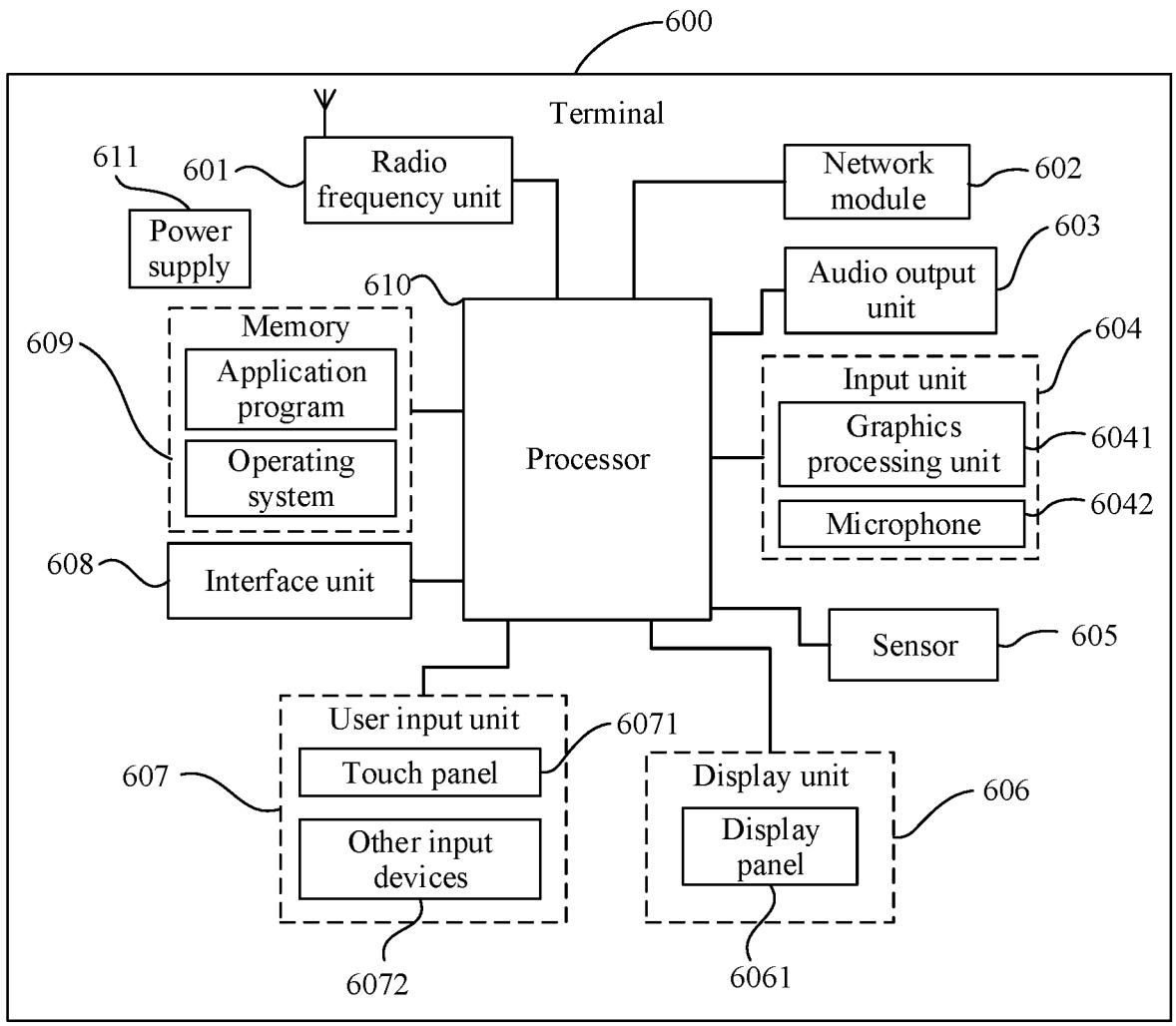
FIG. 6 is a structural diagram of another terminal according to an embodiment of this disclosure.

FIG. 6 is a schematic diagram of a hardware structure of a terminal for implementing the embodiments of this disclosure.

The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the terminal shown in FIG. 6 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

a radio frequency unit 601, configured to receive configuration information transmitted by a network device, where the configuration information is used for configuring target service information for uplink transmissions and uplink transmission drop parameters corresponding to the target service information; and The radio frequency unit 601 is further configured to drop uplink transmissions based on the uplink transmission drop parameters.

In this embodiment of this disclosure, the target service information for uplink transmissions and the uplink transmission drop parameters corresponding to the target service information are configured, and uplink transmissions are dropped based on the uplink transmission drop parameters. As such, uplink transmissions can be dropped for specified target service information. Therefore, uplink transmission dropping is more targeted in uplink transmission drop procedures.

It should be understood that, in this embodiment of this disclosure, the radio frequency unit 601 may be configured to transmit or receive a signal in an information transmitting/receiving or call process. Specifically, the radio frequency unit 601 receives downlink data from a base station and transmits the downlink data to the processor 610 for processing; and transmits uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and other devices through a wireless communications system.

The terminal provides wireless broadband internet access for a user by using the network module 602, for example, helping the user send and receive e-mails, browse web pages, and access streaming media.

The audio output unit 603 may convert audio data received by the radio frequency unit 601 or the network module 602 or stored in the memory 609 into an audio signal and output the audio signal as a sound. In addition, the audio output unit 603 may further provide audio output (for example, a call signal reception tone or a message reception tone) that is related to a specific function performed by the terminal 600. The audio output unit 603 includes a speaker, a buzzer, a telephone receiver, and the like.

The input unit 604 is configured to receive an audio or video signal. The input unit 604 may include a graphics processing unit (GPU) 6041 and a microphone 6042, and the graphics processing unit 6041 processes image data of a still picture or a video obtained by an image capture apparatus (for example, a camera) in an image capture mode or a video capture mode. A processed image frame may be displayed on the display unit 606. An image frame processed by the graphics processing unit 6041 may be stored in the memory 609 (or another storage medium) or sent by the radio frequency unit 601 or the network module 602. The microphone 6042 can receive a sound and can process the sound into audio data. The processed audio data can be converted, for outputting, into a format that can be sent to a mobile communication base station through the radio frequency unit 601 in a telephone call mode.

The terminal 600 further includes at least one sensor 605, for example, an optical sensor, a motion sensor, and other sensors. Specifically, the optical sensor includes an ambient light sensor and a proximity sensor. The ambient light sensor may adjust brightness of a display panel 6061 based on intensity of ambient light. When the terminal 600 moves near an ear, the proximity sensor may disable the display panel 6061 and/or backlight. As a type of motion sensor, an accelerometer sensor can detect magnitudes of accelerations in all directions (usually three axes), can detect a magnitude and a direction of gravity when being static, and can be applied to terminal posture recognition (such as screen switching between portrait and landscape, related games, and magnetometer posture calibration), functions related to vibration recognition (such as pedometer and tapping), and the like. The sensor 605 may also include a fingerprint sensor, a pressure sensor, an iris sensor, a molecular sensor, a gyroscope, a barometer, a hygrometer, a thermometer, an infrared sensor, and the like. Details are not described herein.

The display unit 606 may be configured to display information input by the user or information provided for the user. The display unit 606 may include the display panel 6061. The display panel 6061 may be configured in a form of a liquid crystal display (LCD), an organic light-emitting diode (OLED), or the like.

The user input unit 607 may be used to receive input digit or character information, and generate key signal input that is related to user setting and function control of the terminal. Specifically, the user input unit 607 includes a touch panel 6071 and other input devices 6072. The touch panel 6071, also referred to as a touchscreen, may capture a touch operation performed by a user on or near the touch panel (for example, an operation performed by the user on the touch panel 6071 or near the touch panel 6071 by using any appropriate object or accessory such as a finger or a stylus). The touch panel 6071 may include two parts: a touch detection apparatus and a touch controller. The touch detection apparatus detects a touch direction of the user, detects a signal brought by a touch operation, and transmits the signal to the touch controller. The touch controller receives touch information from the touch detection apparatus, converts the touch information to point coordinates, and sends the point coordinates to the processor 610, and receives and executes a command sent by the processor 610. In addition, the touch panel 6071 may be implemented in a plurality of forms, for example, as a resistive, capacitive, infrared, or surface acoustic wave touch panel. The user input unit 607 may further include other input devices 6072 in addition to the touch panel 6071. Specifically, the other input devices 6072 may include but are not limited to a physical keyboard, a function key (such as a volume control key or a power on/off key), a trackball, a mouse, a joystick, and the like. Details are not described herein.

Further, the touch panel 6071 may cover the display panel 6061. After detecting a touch operation on or near the touch panel 6071, the touch panel 6071 transmits the touch operation to the processor 610 for determining a type of the touch event. Then the processor 610 provides corresponding visual output on the display panel 6061 based on the type of the touch event. Although the touch panel 6071 and the display panel 6061 are used as two separate components to implement input and output functions of the terminal in FIG. 6, the touch panel 6071 and the display panel 6061 may be integrated to implement the input and output functions of the terminal in some embodiments. This is not specifically limited herein.

The interface unit 608 is an interface for connecting an external apparatus to the terminal 600. For example, the external apparatus may include a wired or wireless headphone port, an external power supply (or battery charger) port, a wired or wireless data port, a memory card port, a port for connecting an apparatus provided with an identification module, an audio input/output (I/O) port, a video I/O port, or an earphone port. The interface unit 608 may be used to receive input (for example, data information or electric power) from the external apparatus, and transmit the received input to one or more elements in the terminal 600; or may be used to transmit data between the terminal 600 and the external apparatus.

The memory 609 may be used to store software programs and various data. The memory 609 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 609 may include a high-speed random access memory, and may further include a non-volatile memory, for example, at least one magnetic disk storage device, a flash memory device, or other volatile solid-state storage devices.

The processor 610 is a control center of the terminal, and is connected to all components of the terminal by using various interfaces and lines. By running or executing software programs and/or modules stored in the memory 609 and invoking data stored in the memory 609, the processor 610 executes various functions of the terminal and processes data, so as to perform overall monitoring on the terminal. The processor 610 may include one or more processing units. Optionally, the processor 610 may integrate an application processor and a modem processor. The application processor mainly processes an operating system, a user interface, an application program, and the like. The modem processor mainly processes wireless communication. It may be understood that the modem processor may alternatively not be integrated into the processor 610.

The terminal 600 may further include a power supply 611 (for example, a battery) that supplies power to the components. Optionally, the power supply 611 may be logically connected to the processor 610 by using a power management system, so as to implement functions such as charging management, discharging management, and power consumption management by using the power management system.

In addition, the terminal 600 includes some functional modules that are not shown. Details are not described herein.

Optionally, an embodiment of this disclosure further provides a terminal, including a processor 610, a memory 609, and a computer program stored in the memory 609 and capable of running on the processor 610. When the computer program is executed by the processor 610, the processes of the uplink transmission drop method embodiments are implemented, with the same technical effects achieved. To avoid repetition, details are not described herein again.

Figure 7:
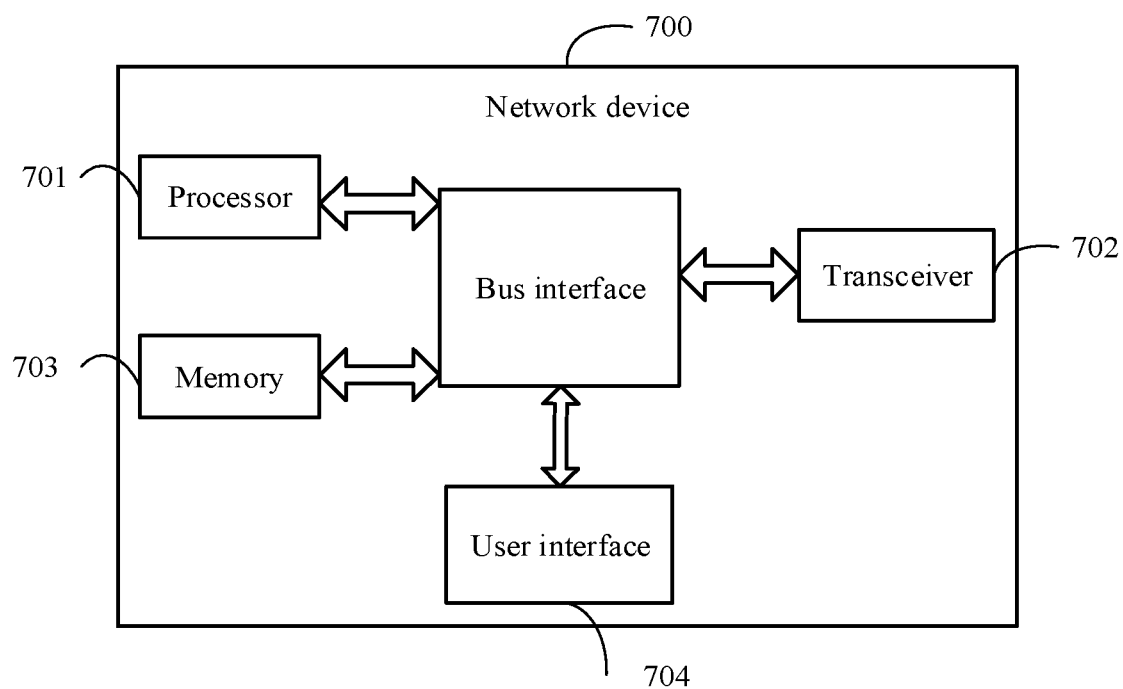
FIG. 7 is a structural diagram of another network device according to an embodiment of this disclosure.

Referring to FIG. 7, FIG. 7 is a structural diagram of another network device according to an embodiment of this disclosure. As shown in FIG. 7, the network device 700 includes a processor 701, a transceiver 702, a memory 703, and a bus interface.

The transceiver 702 is configured to transmit configuration information, where the configuration information is used for configuring target service information for uplink transmissions and uplink transmission drop parameters corresponding to the target service information.

In this embodiment of this disclosure, the target service information for uplink transmissions and the uplink transmission drop parameters corresponding to the target service information are configured, and uplink transmissions are dropped based on the uplink transmission drop parameters. As such, uplink transmissions can be dropped for specified target service information. Therefore, uplink transmission dropping is more targeted in uplink transmission drop procedures.

In FIG. 7, a bus architecture may include any quantity of interconnected buses and bridges, specifically for interconnecting various circuits of one or more processors represented by the processor 701 and a memory represented by the memory 703. The bus architecture may further interconnect various other circuits such as a peripheral device, a voltage regulator, and a power management circuit. These are all common sense in the art, and therefore are not further described in this specification. The bus interface provides interfaces. The transceiver 702 may be a plurality of components, including a transmitter and a receiver, and provides units for communicating with a variety of other apparatuses on a transmission medium. For different user equipment, the user interface 704 may also be an interface capable of externally or internally connecting a required device, and the connected device includes but is not limited to a keypad, a display, a speaker, a microphone, a joystick, and the like.

The processor 701 is responsible for management of the bus architecture and general processing, and the memory 703 may store data for use by the processor 701 when the processor 701 performs an operation.

Optionally, an embodiment of this disclosure further provides a network device, including a processor 701, a memory 703, and a computer program stored in the memory 703 and capable of running on the processor 701. When the computer program is executed by the processor 701, the processes of the uplink transmission drop configuration method embodiments are implemented, with the same technical effects achieved. To avoid repetition, details are not described herein again.

An embodiment of this disclosure further provides a computer-readable storage medium. The computer-readable storage medium stores a computer program, and when the computer program is executed by a processor, the processes of the uplink transmission drop configuration method on a network device side provided in the embodiments of this disclosure are implemented, or when the computer program is executed by a processor, the processes of the uplink transmission drop method on a terminal side provided in the embodiments of this disclosure are implemented, with the same technical effect achieved. To avoid repetition, details are not described herein again. For example, the computer-readable storage medium is a read-only memory (ROM), a random access memory (RAM), a magnetic disk, or an optical disc.

It should be noted that in this specification, the term "comprise", "include", or any other variant thereof is intended to cover a non-exclusive inclusion, so that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a base station, or the like) to perform the methods described in the embodiments of this disclosure.

The embodiments of this disclosure are described above with reference to the accompanying drawings, but this disclosure is not limited to these embodiments. These embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

What is claimed is:

1. An uplink transmission drop method, applied to a terminal and comprising:
   receiving configuration information transmitted by a network device, wherein the configuration information is used for configuring target service information for uplink transmissions and uplink transmission drop parameters corresponding to the target service information; and
   dropping uplink transmissions based on the uplink transmission drop parameters;
   wherein the uplink transmission drop parameters are used to indicate any one of the following:
   an uplink transmission drop number or an uplink transmission drop rate for first service information in uplink transmissions corresponding to the first service information;
   an uplink transmission drop number or an uplink transmission drop rate for second service information in uplink transmissions corresponding to N pieces of first service information, wherein N is an integer greater than 1 and the second service information is one of the N pieces of first service information;
   an uplink transmission drop number for the first service information or the second service information within a preset period; and
   an uplink transmission drop rate for the first service information or the second service information within a preset period; wherein
   the first service information is service information contained in the target service information;
   wherein in a case that the uplink transmission drop parameters are used to indicate an uplink transmission drop number for first service information in uplink transmissions corresponding to the first service information, the uplink transmission drop parameters comprise a number of first uplink transmissions corresponding to the first service information and an allowed number of drops in the number of first uplink transmissions; or,
   wherein in a case that the uplink transmission drop parameters are used to indicate an uplink transmission drop number for second service information in uplink transmissions corresponding to N pieces of first service information, the uplink transmission drop parameters comprise a number of second uplink transmissions and an allowed number of drops for the second service information in the number of second uplink transmissions, wherein the number of second uplink transmissions is a sum of numbers of uplink transmissions corresponding to the N pieces of first service information; or,
   wherein in a case that the uplink transmission drop parameters are used to indicate an uplink transmission drop number for the first service information or the second service information within a preset period, the uplink transmission drop parameters comprise duration of the preset period and an allowed number of dropped third uplink transmissions for the first service information or the second service information within the preset period.

2. The method according to claim 1, wherein the target service information is in one-to-one correspondence to the uplink transmission drop parameters.

3. The method according to claim 1, wherein the target service information comprises service information corresponding to at least one of the following types of service:
   a type of channel;
   uplink transmission priority;
   logical channel index;
   logical channel priority;
   reliability grade; and
   latency grade.

4. The method according to claim 3, wherein in a case that there are at least two pieces of third service information under one type of service of one target uplink transmission, determining fourth service information of the target uplink transmission according to a configuration by a network device or a protocol specification, wherein the fourth service information is one of the at least two pieces of third service information.

5. The method according to claim 4, wherein in a case that the type of service corresponding to the third service information is uplink transmission priority or logical channel priority, the fourth service information is first priority information, wherein a priority corresponding to the first priority information is higher or lower than a priority corresponding to second priority information, the first priority information is one of the at least two pieces of third service information, and the second priority information is priority information corresponding to service information other than the fourth service information in the at least two pieces of third service information; and/or
   in a case that the type of service corresponding to the third service information is logical channel index, the fourth service information is first logical channel index information, wherein a logical channel index corresponding to the first logical channel index information is greater or less than a logical channel index corresponding to second logical channel index information, the first logical channel index information is one of the at least two pieces of third service information, and the second logical channel index information is logical channel index information corresponding to service information other than the fourth service information in the at least third service information; and/or
   in a case that the type of service corresponding to the third service information is reliability grade or latency grade, the fourth service information is first grade information, wherein a grade corresponding to the first grade information is higher or lower than a grade corresponding to second grade information, the first grade information is one of the at least two pieces of third service information, and the second grade information is grade information corresponding to service information other than the fourth service information in the at least third service information.

6. An uplink transmission drop configuration method, applied to a network device, and comprising:
    transmitting configuration information, wherein the configuration information is used for configuring target service information for uplink transmissions and uplink transmission drop parameters corresponding to the target service information;
    wherein the uplink transmission drop parameters are used to indicate any one of the following:
    an uplink transmission drop number or an uplink transmission drop rate for first service information in uplink transmissions corresponding to the first service information;
    an uplink transmission drop number or an uplink transmission drop rate for second service information in uplink transmissions corresponding to N pieces of first service information, wherein N is an integer greater than 1 and the second service information is one of the N pieces of first service information;
    an uplink transmission drop number for the first service information or the second service information within a preset period; and
    an uplink transmission drop rate for the first service information or the second service information within a preset period; wherein
    the first service information is service information contained in the target service information;
    wherein in a case that the uplink transmission drop parameters are used to indicate an uplink transmission drop number for first service information in uplink transmissions corresponding to the first service information, the uplink transmission drop parameters comprise a number of first uplink transmissions corresponding to the first service information and an allowed number of drops in the number of first uplink transmissions; or,
    wherein in a case that the uplink transmission drop parameters are used to indicate an uplink transmission drop number for second service information in uplink transmissions corresponding to N pieces of first service information, the uplink transmission drop parameters comprise a number of second uplink transmissions and an allowed number of drops for the second service information in the number of second uplink transmissions, wherein the number of second uplink transmissions is a sum of numbers of uplink transmissions corresponding to the N pieces of first service information; or,
    wherein in a case that the uplink transmission drop parameters are used to indicate an uplink transmission drop number for the first service information or the second service information within a preset period, the uplink transmission drop parameters comprise duration of the preset period and an allowed number of dropped third uplink transmissions for the first service information or the second service information within the preset period.

7. The method according to claim 6, wherein the target service information is in one-to-one correspondence to the uplink transmission drop parameters.

8. The method according to claim 6, wherein the target service information comprises service information corresponding to at least one of the following types of service:
    a type of channel;
    uplink transmission priority;
    logical channel index;
    logical channel priority;
    reliability grade; and
    latency grade.

9. The method according to claim 8, wherein in a case that there are at least two pieces of third service information under one type of service of one target uplink transmission, fourth service information of the target uplink transmission is determined according to a configuration by a network device or a protocol specification, wherein the fourth service information is one of the at least two pieces of third service information.

10. The method according to claim 9, wherein
    in a case that the type of service corresponding to the third service information is uplink transmission priority or logical channel priority, the fourth service information is first priority information, wherein a priority corresponding to the first priority information is higher or lower than a priority corresponding to the second priority information, the first priority information is one of the at least two third service information, and the second priority information is priority information corresponding to service information other than the fourth service information in the at least two pieces of third service information; and/or
    in a case that the type of service corresponding to the third service information is logical channel index, the fourth service information is first logical channel index information, wherein a logical channel index corresponding to the first logical channel index information is greater or less than a logical channel index corresponding to second logical channel index information, the first logical channel index information is one of the at least two pieces of third service information, and the second logical channel index information is logical channel index information corresponding to service information other than the fourth service information in the at least third service information; and/or
    in a case that the type of service corresponding to the third service information is reliability grade or latency grade, the fourth service information is first grade information, wherein a grade corresponding to the first grade information is higher or lower than a grade corresponding to second grade information, the first grade information is one of the at least two pieces of third service information, and the second grade information is grade information corresponding to service information other than the fourth service information in the at least third service information.

11. A terminal, comprising a memory, a processor, and a program stored in the memory and capable of running on the processor, wherein when the program is executed by the processor, the steps of the uplink transmission drop method are implemented, the method comprises:
    receiving configuration information transmitted by a network device, wherein the configuration information is used for configuring target service information for uplink transmissions and uplink transmission drop parameters corresponding to the target service information; and
    dropping uplink transmissions based on the uplink transmission drop parameters;
    wherein the uplink transmission drop parameters are used to indicate any one of the following:

an uplink transmission drop number or an uplink transmission drop rate for first service information in uplink transmissions corresponding to the first service information;

an uplink transmission drop number or an uplink transmission drop rate for second service information in uplink transmissions corresponding to N pieces of first service information, wherein N is an integer greater than 1 and the second service information is one of the N pieces of first service information;

an uplink transmission drop number for the first service information or the second service information within a preset period; and an uplink transmission drop rate for the first service information or the second service information within a preset period; wherein the first service information is service information contained in the target service information;

wherein in a case that the uplink transmission drop parameters are used to indicate an uplink transmission drop number for first service information in uplink transmissions corresponding to the first service information, the uplink transmission drop parameters comprise a number of first uplink transmissions corresponding to the first service information and an allowed number of drops in the number of first uplink transmissions; or, wherein in a case that the uplink transmission drop parameters are used to indicate an uplink transmission drop number for second service information in uplink transmissions corresponding to N pieces of first service information, the uplink transmission drop parameters comprise a number of second uplink transmissions and an allowed number of drops for the second service information in the number of second uplink transmissions, wherein the number of second uplink transmissions is a sum of numbers of uplink transmissions corresponding to the N pieces of first service information; or, wherein in a case that the uplink transmission drop parameters are used to indicate an uplink transmission drop number for the first service information or the second service information within a preset period, the uplink transmission drop parameters comprise duration of the preset period and an allowed number of dropped third uplink transmissions for the first service information or the second service information within the preset period.

12. The terminal according to claim 11, wherein the target service information is in one-to-one correspondence to the uplink transmission drop parameters.

13. The terminal according to claim 11, wherein in a case that there are at least two pieces of third service information under one type of service of one target uplink transmission, determining fourth service information of the target uplink transmission according to a configuration by a network device or a protocol specification, wherein the fourth service information is one of the at least two pieces of third service information.

14. The terminal according to claim 13, wherein in a case that the type of service corresponding to the third service information is uplink transmission priority or logical channel priority, the fourth service information is first priority information, wherein a priority corresponding to the first priority information is higher or lower than a priority corresponding to second priority information, the first priority information is one of the at least two pieces of third service information, and the second priority information is priority information corresponding to service information other than the fourth service information in the at least two pieces of third service information; and/or in a case that the type of service corresponding to the third service information is logical channel index, the fourth service information is first logical channel index information, wherein a logical channel index corresponding to the first logical channel index information is greater or less than a logical channel index corresponding to second logical channel index information, the first logical channel index information is one of the at least two pieces of third service information, and the second logical channel index information is logical channel index information corresponding to service information other than the fourth service information in the at least third service information; and/or in a case that the type of service corresponding to the third service information is reliability grade or latency grade, the fourth service information is first grade information, wherein a grade corresponding to the first grade information is higher or lower than a grade corresponding to second grade information, the first grade information is one of the at least two pieces of third service information, and the second grade information is grade information corresponding to service information other than the fourth service information in the at least third service information.

* * * * *